United States Patent
Chandrasekaran et al.

(10) Patent No.: US 11,706,152 B2
(45) Date of Patent: Jul. 18, 2023

(54) METHODS AND SYSTEMS FOR QUEUE AND PIPELINE LATENCY METROLOGY IN NETWORK DEVICES AND SMART NICS

(71) Applicant: Pensando Systems Inc., Milpitas, CA (US)

(72) Inventors: Varagur Chandrasekaran, Fremont, CA (US); Allen Hubbe, Durham, NC (US); Shrikant Vaidya, San Jose, CA (US)

(73) Assignee: Pensando Systems Inc., Milpitas, CA (US)

( * ) Notice: Subject to any disclaimer, the term of this patent is extended or adjusted under 35 U.S.C. 154(b) by 45 days.

(21) Appl. No.: 17/347,875

(22) Filed: Jun. 15, 2021

(65) Prior Publication Data
US 2022/0400083 A1   Dec. 15, 2022

(51) Int. Cl.
*H04L 47/56* (2022.01)
*H04L 47/62* (2022.01)

(52) U.S. Cl.
CPC ........ *H04L 47/562* (2013.01); *H04L 47/6225* (2013.01)

(58) Field of Classification Search
CPC .......................... H04L 47/562; H04L 47/6225
See application file for complete search history.

(56) References Cited

U.S. PATENT DOCUMENTS

| | | | | |
|---|---|---|---|---|
| 10,313,103 B1* | 6/2019 | Perras | ................ | H04B 10/516 |
| 2001/0033572 A1* | 10/2001 | Caldara | ............... | H04L 49/3081 |
| | | | | 370/352 |
| 2003/0048754 A1* | 3/2003 | Bruckman | .............. | H04L 43/50 |
| | | | | 370/252 |
| 2005/0129017 A1* | 6/2005 | Guingo | ................... | H04L 45/16 |
| | | | | 370/390 |
| 2005/0240745 A1* | 10/2005 | Iyer | ..................... | G06F 13/1668 |
| | | | | 711/E12.079 |
| 2015/0234582 A1* | 8/2015 | Badea | ..................... | G06F 11/26 |
| | | | | 715/771 |

(Continued)

OTHER PUBLICATIONS

Calnex Solutions Ltd, "Implementing IEEE 1588v2 for use in the mobile backhaul", Technical Brief, 2009, 24 pgs.

(Continued)

*Primary Examiner* — Stephen J Clawson
(74) *Attorney, Agent, or Firm* — Loza & Loza LLP

(57) ABSTRACT

Inbound packets can be received by a network device that determines a receive pipeline latency metric based on a plurality of receive pipeline residency times of the inbound packets and determines a receive queue latency metric based on a plurality of receive queue residency times of the inbound packets. The receive queue latency metric and the receive pipeline latency metric can be reported to a data collector. The network appliance may also receive a plurality of outbound packets on a transmit queue, determine a transmit queue latency metric based on the transmit queue residency times of the outbound packets, and determine a transmit pipeline latency metric based on the transmit pipeline residency times of the outbound packets. The outbound packets may be transmitted toward their destination. The transmit queue latency metric and the transmit pipeline latency metric can be reported to the data collector.

20 Claims, 15 Drawing Sheets

(56) References Cited

U.S. PATENT DOCUMENTS

2021/0006638 A1* 1/2021 Bhide .................. H04L 67/561
2021/0266085 A1* 8/2021 Evans .................. H04J 3/0667

OTHER PUBLICATIONS

Watt, Steve T. et al. "Understanding and Applying Precision Time Protocol", Presented at Saudi Arabia Smart Grid 2015, Jeddah, Saudi Arabia, Dec. 7-9, 2015, 8 pgs.

Lombardi, Michael A., "Comparing LORAN Timing Capability to Industrial Requirements", May 23, 2014, 15 pgs.

Eidson, John, "IEEE-1588 Standard Version 2—A Tutorial-", Oct. 2, 2006, 21 pgs.

"IEEE 1588 Implementation in Industry IoT Solution", https://community.nxp.com/t5/Layerscape-Knowledge-Base/IEEE-1588-Implementation-in-Industry-IoT-Solution/ta-p/1121212, Jun. 28, 2017, 8 pgs.

Geng, Yilong et al. "Exploiting a Natural Network Effect for Scalable, Fine-grained Clock Synchronization", included in the Proceedings of the 15th USENIX Symposium on Networked Systems Design and Implementation (NSDI '18). Apr. 9-11, 2018, Renton, WA, USA, 15 pgs.

Geng, Yilong et al. "SIMON: A Simple and Scalable Method for Sensing, Inference and Measurement in Data Center Networks", included in the Proceedings of the 16th USENIX Symposium on Networked Systems Design and Implementation (NSDI '19), Feb. 26-28, 2019, Boston, MA, USA, 17 pgs.

Sadasivan, G. et al. "Architecture for IP Flow Information Export", RFC: 5470, Mar. 2009, 31 pgs.

Sarick, Ryan A., "The Impact of Network Latency on the Synchronization of Real-World IEEE 1588-2008 Devices Using 1588 and non-1588 Aware Switches", 2011, 84 pgs.

Arnold, Douglas, "What Are All Of These IEEE 1588 Clock Types? Five Minute Facts About Packet Timing", https://blog.meinbergglobal.com/2013/10/21/ieee-1588-clock-types/, Oct. 21, 2013, 12 pgs.

* cited by examiner

METHODS AND SYSTEMS FOR QUEUE AND PIPELINE LATENCY METROLOGY IN NETWORK DEVICES AND SMART NICS

TECHNICAL FIELD

The embodiments relate to computer networks, local area networks, network appliances such as routers, switches, network interface cards (NICs), smart NICs, distributed service cards (DSCs), packet processing pipelines, network packet processing queues, timestamping, and network analytics.

BACKGROUND

A network appliance, such as a smart NIC can have an ingress pipeline, numerous receive queues, numerous transmit queues, and an egress pipeline. Network packets received by an ingress port can be placed on the receive queues until processed. Packets to be sent via an egress port can be placed on the transmit queues after which they can be processed and passed to the egress pipeline. Applications in the network appliance can receive packets via the receive queues and can place packets on the transmit queues. DSCs can be installed in host machines that may be running a variety of applications and virtual machines (VMs). The host machine's applications and VMs can receive network packets via the receive queues and can place network packets on transmit queues for transmission to other machines. Network appliances can assemble statistics, such as packet counts and bandwidth usage and the statistics can be in aggregate, per application, or per network flow. Network appliances can export the assembled statistics to a collector using a protocol such as the Internet protocol flow information export (IPFIX) protocol. The Internet engineering task force (IETF) has published specifications for IPFIX as requests for comment (RFCs) 7011-7015, and request for comment (RFC) 5103.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a method. The method can include receiving a plurality of inbound packets, determining a receive pipeline latency metric based on a plurality of receive pipeline residency times of the inbound packets, determining a receive queue latency metric based on a plurality of receive queue residency times of the inbound packets, and reporting the receive queue latency metric and the receive pipeline latency metric to a data collector.

Another aspect of the subject matter described in this disclosure can be implemented by a method. The method can include receiving a plurality of outbound packets on a transmit queue, determining a transmit queue latency metric based on a plurality of transmit queue residency times of the outbound packets, determining a transmit pipeline latency metric based on a plurality of transmit pipeline residency times of the outbound packets, transmitting the outbound packets, and reporting the transmit queue latency metric and the transmit pipeline latency metric to a data collector.

Yet another aspect of the subject matter described in this disclosure can be implemented by a system comprising a means for determining a receive queue latency metric, a means for determining a receive pipeline latency metric, a means for determining a transmit queue latency metric, a means for determining a transmit pipeline latency metric, and a means for reporting the receive queue latency metric, the receive pipeline latency metric, the transmit queue latency metric, and the transmit pipeline latency metric to a data collector.

In some implementations of the methods and devices, the method can include dequeuing the inbound packets from a receive queue, and providing the inbound packets to a precision time protocol (PTP) stack, wherein the inbound packets are PTP packets. In some implementations of the methods and devices, the method can include determining a plurality of receive queue latency metrics for a plurality of receive queues, and reporting the receive queue latency metrics to the data collector, wherein the inbound packets are enqueued on the plurality of receive queues, and the receive queue latency metric is one of the receive queue latency metrics. In some implementations of the methods and devices, the inbound packets are PTP packets, and the PTP packets are enqueued on the receive queues according to a policy. In some implementations of the methods and devices, the policy is a round robin policy. In some implementations of the methods and devices, the inbound packets are selected from inbound network traffic according to a policy.

In some implementations of the methods and devices, the receive queue latency metric and the receive pipeline latency metric are sent to the data collector in an internet protocol flow information export packet. In some implementations of the methods and devices, the method can include receiving a plurality of outbound packets on a transmit queue, determining a transmit queue latency metric based on a plurality of transmit queue residency times of the outbound packets, determining a transmit pipeline latency metric based on a plurality of transmit pipeline residency times of the outbound packets, transmitting the outbound packets, and reporting the transmit queue latency metric and the transmit pipeline latency metric to the data collector.

In some implementations of the methods and devices, the method can include timestamping the outbound packets with a transmit queue enqueuing time. In some implementations of the methods and devices, the method can include timestamping the outbound packets with a transmit queue dequeuing time. In some implementations of the methods and devices, the outbound packets are selected from outbound network traffic according to a policy. In some implementations of the methods and devices, the method can include determining a plurality of transmit queue latency metrics for a plurality of transmit queues, and reporting the transmit queue latency metrics to the data collector, wherein the outbound packets are enqueued on the plurality of transmit queues, and the transmit queue latency metric is one of the transmit queue latency metrics. In some implementations of the methods and devices, the outbound packets are PTP packets, and the PTP packets are enqueued on the transmit queues according to a policy. In some implementations of the methods and devices, the policy is a round robin policy. In some implementations of the methods and devices, the method can include timestamping the inbound packets with a receive queue enqueuing time. In some implementations of the methods and devices, the method can include timestamping the inbound packets with a receive queue dequeuing time.

In some implementations of the methods and devices, the outbound packets are selected from outbound network traffic according to a policy. In some implementations of the methods and devices, the method can include determining a plurality of transmit queue latency metrics for a plurality of transmit queues, and reporting the transmit queue latency metrics to the data collector, wherein the outbound packets are enqueued on the plurality of transmit queues, and the transmit queue latency metric is one of the transmit queue latency metrics. In some implementations of the methods and devices, the outbound packets are PTP packets, and the PTP packets are enqueued on the transmit queues according to a policy. In some implementations of the methods and devices, the policy is a round robin policy.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
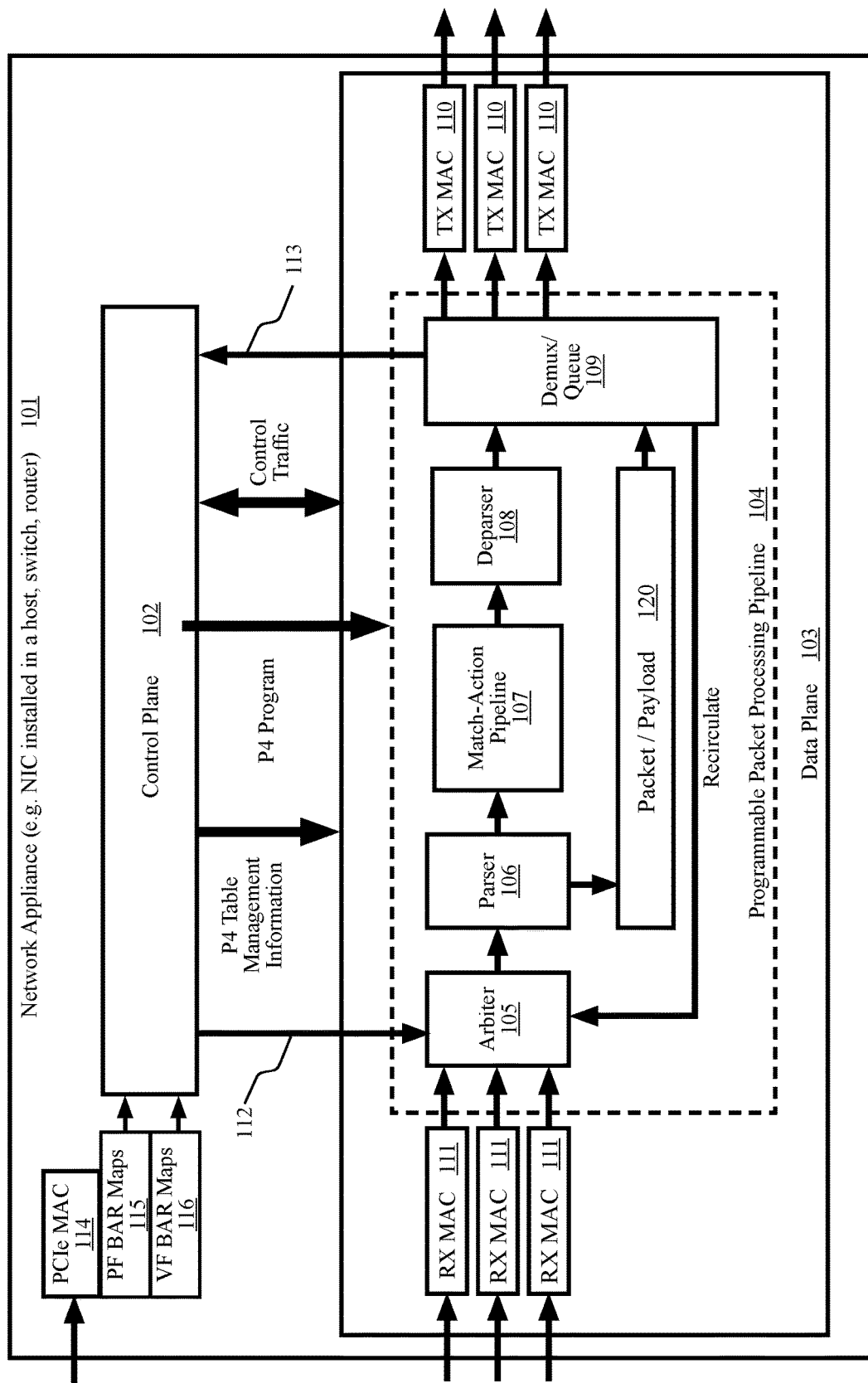
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Numerous metrics are collected to measure the speed with which network packets are processed by network appliances or pass through a network. A network appliance can collect such data and display it on a dashboard of the network appliance's graphical user interface (GUI). The network appliance can also export the data to a collector that collects the data from numerous, perhaps hundreds or thousands, of network appliances. An administrator may then observe the data on a GUI or mine the data to discern network problems, plan upgrades, optimize performance, or migrate workloads (e.g., datacenter tenant VMs) among host computers. Automated agents can also use the data to automate some of the administrators' tasks. Standardized network protocols for Internet protocol flow information export have been created and are used for sharing and collecting the data and metrics collected by the network appliances. One such protocol is the Internet protocol flow information export (IPFIX) protocol. The Internet engineering task force (IETF) has published specifications for IPFIX as requests for comment (RFCs) 7011-7015, and request for comment (RFC) 5103. Non-standard and vendor specific protocols for Internet protocol flow information export have also been used.

The currently collected metrics can be augmented by additional metrics such as receive pipeline latency metrics, measured receive queue latency metrics, predicted receive queue latency metrics, transmit pipeline latency metrics, measured transmit queue latency metrics, and predicted transmit queue latency metrics. The latency metrics can be useful for diagnosing device load issues. The latency metrics can also be used to detect issues with the receive and transmit queues. There can be numerous receive and transmit queues. For example, different network flows can use different queues, each network flow may have its own queue, network flows having the same priority or quality of service (QoS) guarantee may share a queue, etc. In many cases, based on the rules and configuration of the network appliances, queue latencies can vary. For example, high priority queues can consume excessive amounts of the available processing resources thereby leading to bursty performance or low performance for lower priority queues.

The additional metrics can be obtained by time stamping packets at certain points during ingress, egress, enqueuing, and dequeuing. The timestamps can be used to measure specific pipeline latencies and queue latencies. Using all the packets for latency metrology may consume more resources than desired. As such, only specific packets may be used for latency metrology. In some implementations, existing packets can be selected and marked for use in latency metrology. The packets may be selected for latency metrology according to a policy. The policy may include selecting packets based on protocol (e.g., every PTP packet or every PTP packet having a specific clock domain identifier). PTP-packets can be chosen to be one of the opportunistic candidates to measure queuing latencies because, in many implementations, the PTP-protocol time-sync implementation is not affected by queueing latencies and the PTP packets can therefore be queued to any queue at will. As such, the PTP packets may provide better flexibilities in measuring latencies of receive queues and transmit-queues to thereby help in proactive queue-monitoring and troubleshooting. The policy may include selecting every Nth (e.g., 10,000th) packet. In some implementations, packets may be injected into network traffic flows. For example, precision time protocol (PTP) packets may be injected into the network traffic flows and the network appliance can be configured to calculate latency metrics using PTP packets. In general, a network traffic flow consists of the network packets passing between two applications. Metrics such as the average value, minimum value, and maximum value can be determined for each of the measured latencies. The metrics can be used for monitoring device and network performance.

In the field of data networking, the functionality of network appliances such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing.

FIG. 1 is a functional block diagram of a network appliance having a control plane and a data plane and in which aspects may be implemented. A network appliance 101 can have a control plane 102 and a data plane 103. The control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBS) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "P4$_{16}$ Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MACs 111 implement media access control on incoming packets via, for example, a MAC protocol such as Ethernet. The MAC protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 110 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 1, a P4 program is provided to the data plane 103 via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, as a P4 programmable router, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector or "PHV." The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, InfiniBand PDUs, etc.) as determined by the match-action pipeline. In some cases, a packet/payload may travel in a separate queue or buffer 120, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 105 for additional processing.

A network appliance 101 can have a peripheral component interconnect extended (PCIe) interface such as PCIe media access control (MAC) 114. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-IOV) capable. Such PCIe devices can have a physical function (PF) and multiple virtual functions (VFs). A PF BAR map 115 can be used by the host machine to communicate with the PCIe card. A VF BAR map 116 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC" VFs and "InfiniBand" VFs to VMs running on the host. The InfiniBand PF and VFs can be used for data transfers, such as remote direct memory access (RDMA) transfers to other VMs running on the same or other host computers. Similarly, a NIC can provide non-volatile memory express (NVMe) and small computer system interface (SCSI) PFs and VFs to VMs running on the host.

Figure 2:
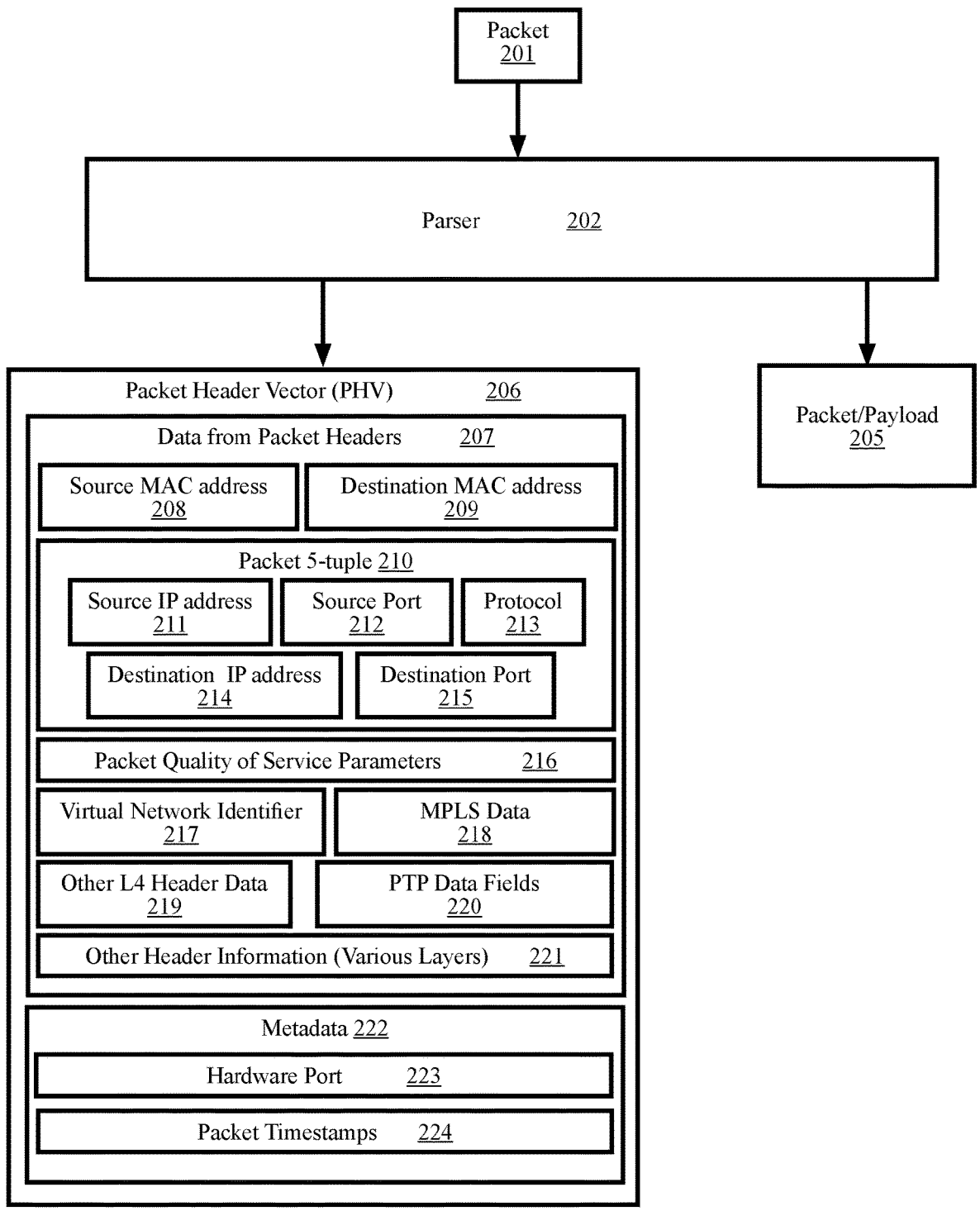
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamps 224 indicating when the packet 201 was received by the network appliance, enqueued, dequeued, etc.

The source MAC address 208 and the destination MAC address 209 can be obtained from the packet's layer 2 header. The source IP address 211 can be obtained from the packet's layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packet's layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. The L7 data fields 220 can be obtained from the packet's layer 7 header or layer 7 payload. The other header information 221 is the other information contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Figure 3:
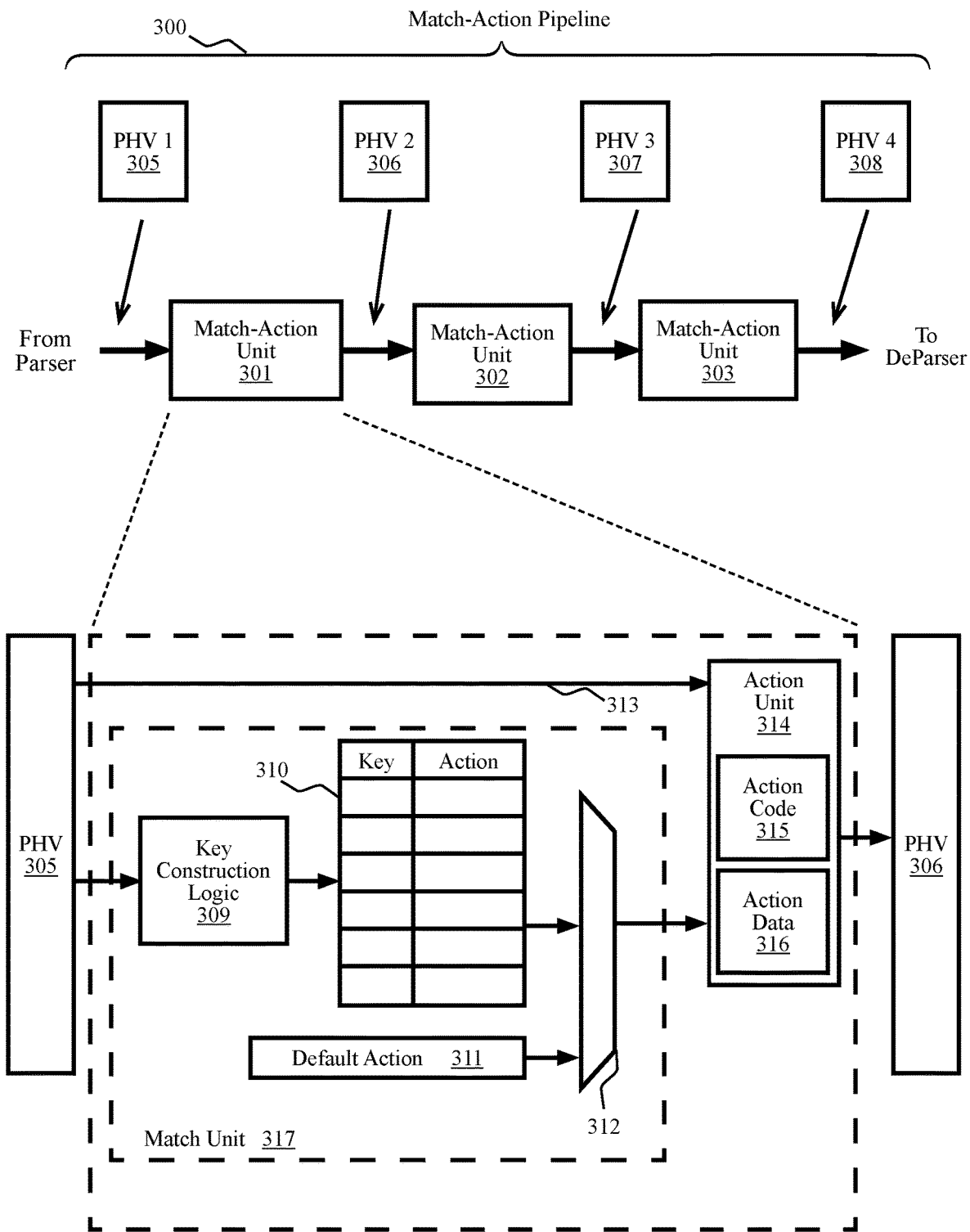
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 305 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action unit can be programmable by the control plane via P4 and the contents of the lookup table are managed by the control plane.

Figure 4:
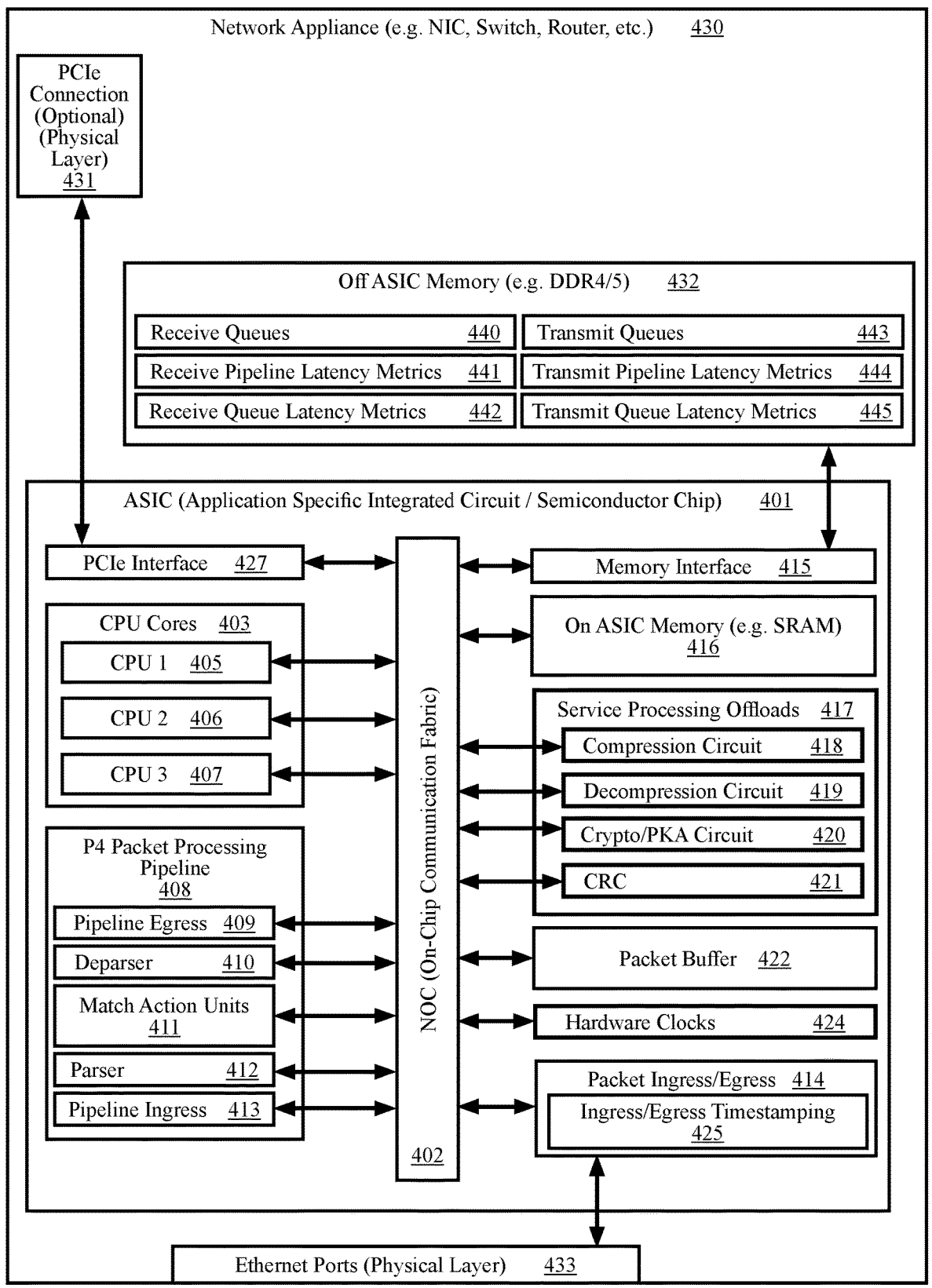
FIG. 4 is a functional block diagram of a network appliance having an ASIC (application specific integrated circuit), according to some aspects.

FIG. 4 is a functional block diagram of a network appliance 430 having an application specific integrated circuit (ASIC) 401, according to some aspects. If the network appliance is a network interface card (NIC) then the NIC can be installed in a host computer and can act as a network appliance for the host computer and for virtual machines running on the host computer. Such a NIC can have a PCIe connection 431 for communicating with the host computer. The network appliance 430 can have an ASIC 401, off-ASIC memory 432, and ethernet ports 433. The off-ASIC memory 432 can be one of the widely available memory modules or chips such as double data rate 4 (DDR4) synchronous dynamic random-access memory (SDRAM) such that the ASIC has access to many gigabytes of memory on the network appliance 430. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used AXI bus. The ASIC's core circuits can include a PCIe interface 427, CPU cores 403, P4 packet processing pipeline 408 elements, memory interface 415, on ASIC memory (e.g., SRAM) 416, service processing offloads 417, a packet buffer 422, extended packet processing pipeline 423, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a CRC calculation circuit 421. The specific core circuits implemented within the non-limiting example of ASIC 401 have been selected such that the ASIC implements many, perhaps all, of the functionality of an InfiniBand channel adapter, of an NVMe card, and of a network appliance that processes network traffic flows carried by IP (internet protocol) packets.

A network device can include precision clocks that output a precise time, clocks that are synchronized to remote authoritative clocks via PTP, and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. clock period). Time values obtained from the clocks can be used as timestamps for events such as enqueuing/dequeuing a packet.

The P4 packet processing pipeline 408 is a specialized set of elements for processing network packets such as IP (internet protocol) packets and InfiniBand PDUs (protocol data units). The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is currently defined in the "$P4_{16}$ Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system and for storing data used by the processes implementing network services. A network appliance that implements pipeline and queue latency metrology can store receive queues 440, receive pipeline latency metrics 441, receive queue latency metrics 442, transmit queues 443, transmit pipeline latency metrics 444, transmit queue latency metrics 445, a log of latency measurements (e.g., all latency measurements for a recent time period), etc.

The CPU cores 403 can be general purpose processor cores, such as ARM processor cores, MIPS processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuitry 408.

The packet processing circuitry 408 can be a specialized circuit or part of a specialized circuit using one or more ASICs or FPGAs to implement programmable packet processing pipelines such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

All memory transactions in the network appliance 430, including host memory transactions, on board memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
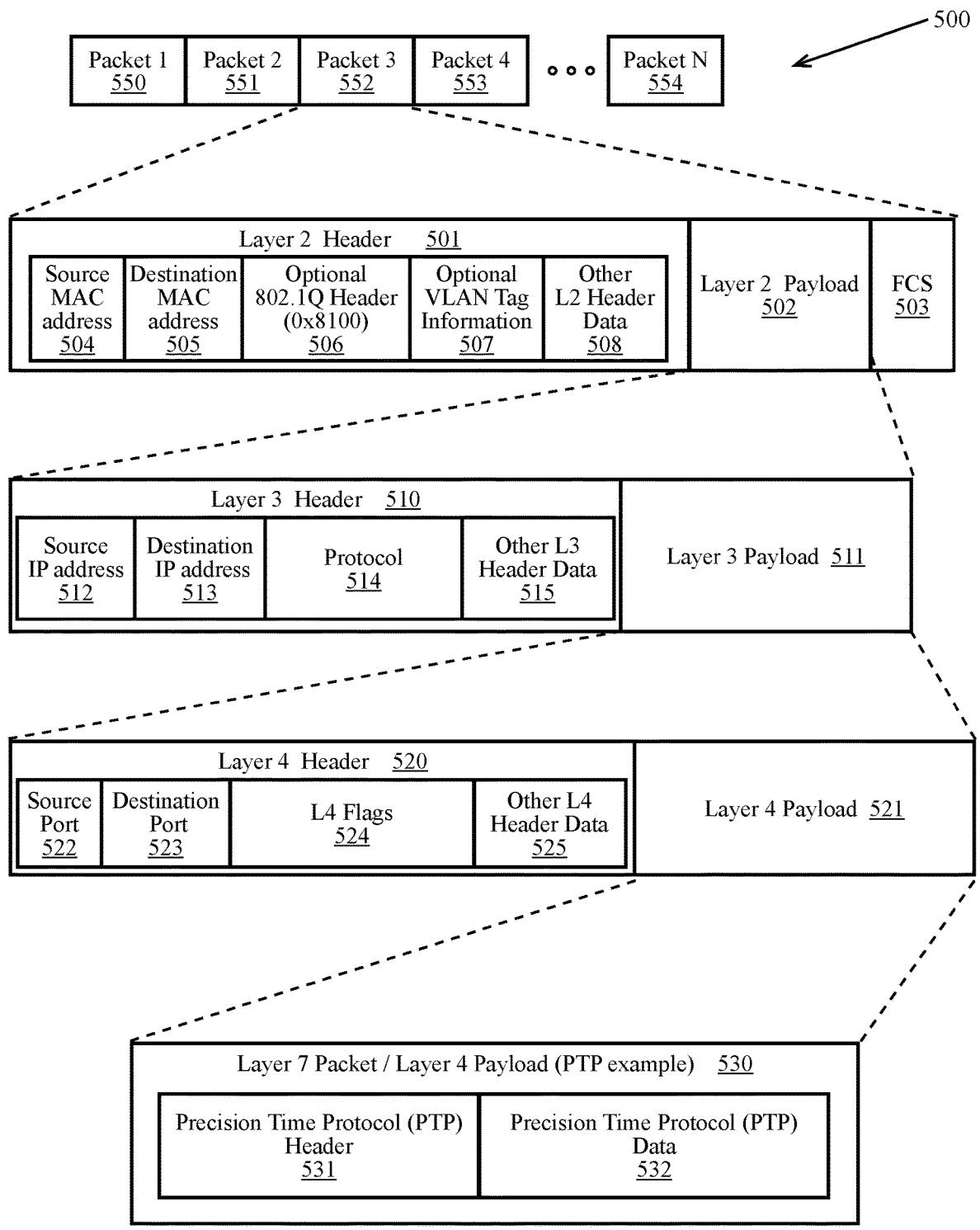
FIG. 5 illustrates packet headers and payloads of packets for network traffic flows including layer 7 fields according to some aspects.

FIG. 5 illustrates packet headers and payloads of packets for network traffic flows 500 including layer 7 fields according to some aspects. A network traffic flow 500 can have numerous packets such as a first packet 550, a second packet 551, a third packet 552, a fourth packet 553, and a final packet 554 with many more packets between the fourth packet 553 and the final packet 554. The term "the packet" or "a packet" may refer to any of the packets in a network traffic flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 501, a layer 2 payload 502, and a layer 2 frame check sequence (FCS) 503. The layer 2 header can contain a source MAC address 504, a destination MAC address 505, an optional 802.1Q header 506, optional VLAN tag information 507, and other layer 2 header data 508. The input ports 111 and output ports 110 of a network appliance 101 can have MAC addresses. A network appliance 101 can have a MAC address that is applied to all or some of the ports. Alternatively, a network appliance may have one or more ports that each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3, is a layer 2 protocol. IEEE 802.11 (WiFi) is another widely used layer 2 protocol. The layer 2 payload 502 can include a Layer 3 packet. The layer 2 FCS 503 can include a CRC (cyclic redundancy check) calculated from the layer 2 header and layer 2 payload. The layer 2 FCS can be used to verify that the packet has been received without errors.

IEEE 802.1Q is the networking standard that supports VLANs on IEEE 802.3 networks. The optional 802.1Q header 506 and VLAN tag information 507 are specified by the IEEE 802.1Q standard. The 802.1Q header is the two-octet value 0x8100 that indicates that VLAN tag information 507 is present. The VLAN tag information includes a 12-bit VLAN identifier. As such, a LAN can be configured to have 4094 VLANs (0x000 and 0xFFF are reserved values).

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 510 and a layer 3 payload 511. The layer 3 header 510 can have a source IP address 512, a destination IP address 513, a protocol indicator 514, and other layer 3 header data 515. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 511 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 510 using protocol indicator 514. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 511 includes a TCP header and a TCP payload. UDP can provide for computer applications to send messages, in this case referred to as datagrams, to other hosts on an IP network using a connectionless model. When carrying UDP data, a layer 3 payload 511 includes a UDP header and a UDP payload. ICMP is used by network devices, including routers, to send error messages and operational information indicating success or failure when communicating with another IP address. ICMP uses a connectionless model.

A layer 4 packet can have a layer 4 header 520 and a layer 4 payload 521. The layer 4 header 520 can include a source port 522, destination port 523, layer 4 flags 524, and other layer 4 header data 525. The source port and the destination port can be integer values used by host computers to deliver packets to application programs configured to listen to and send on those ports. The layer 4 flags 524 can indicate a status of or action for a network traffic flow. A layer 4 payload 521 can contain a layer 7 packet.

The application layer, often called layer 7, includes the protocols used by most applications for providing user services or exchanging application data over the network connections established by the lower-level protocols. Examples of application layer protocols include Precision Time Protocol (PTP), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol units (such as TCP or UDP messages), which in turn use lower layer protocols to effect actual data transfer.

A layer 4 payload 521 may include a layer 7 packet 530. A layer 7 packet can have a layer 7 header 531 and a layer 7 payload 532. The illustrated layer 7 packet is a PTP packet. The IEEE published the specification IEEE 1588-2019 that describes and standardized the PTP protocol. PTP can be carried by UDP packets at layer 3 or by layer 2 packets such as ethernet packets.

Figure 6:
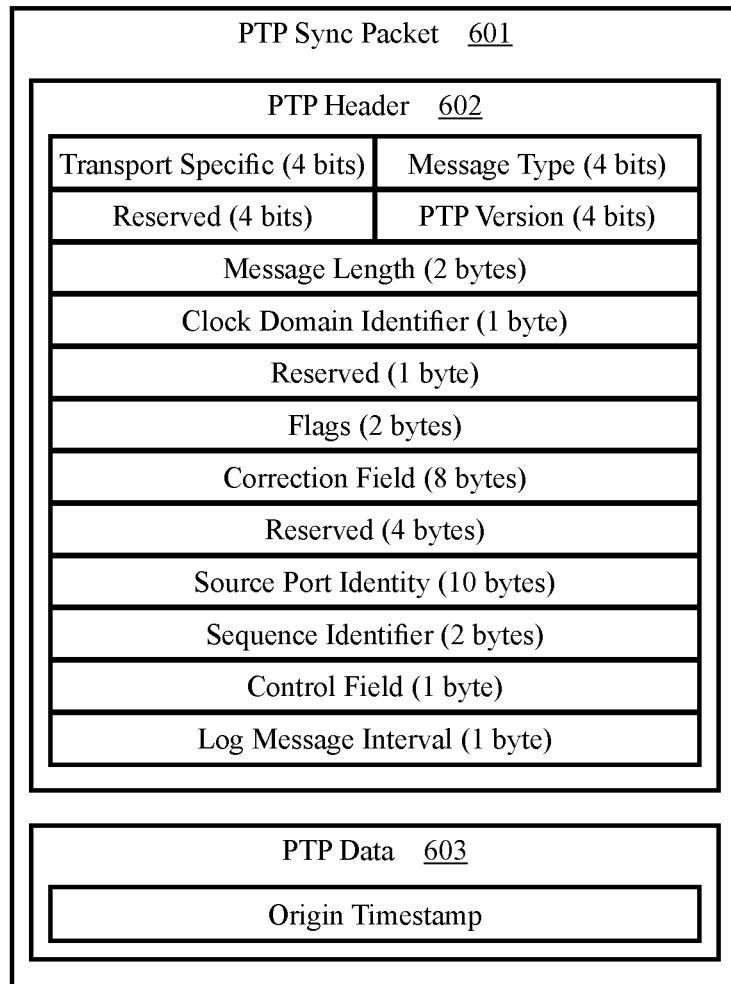
FIG. 6 illustrates a PTP sync packet that can be used in accordance with certain aspects.

FIG. 6 illustrates a PTP sync packet 601 that can be used in accordance with certain aspects. The PTP packet includes a PTP header 602 and PTP data 603. The PTP header includes a message type field, a message length field, a clock domain identifier, flags, a correction field, a source porty identity, a sequence identifier, a control field, and a log message interval. The message type field can indicate the type of message (e.g., sync, delay request, delay response, etc.). The message length field indicates the full length of the PTP message. The clock domain identifier indicates the clock domain the PTP message belongs to. A clock domain is a logical grouping of clocks that synchronize to each other using PTP. The clocks in one domain are not necessarily synchronized to those in another domain. The flags field can indicate status. The correction field includes a correction value in nanoseconds that indicates residence time within a transparent clock and, for peer-to-peer transparent clocks, includes the path delay. The source port identity field identifies the originating port for the PTP message. The sequence identifier field can contain a sequence number for individual message types. The control field may contain a value that depends on the message type. The log message interval field is determined by the type of the message. The PTP data 603 includes an origin timestamp. The origin timestamp indicates the time that the PTP packet was transmitted by its originator.

Figure 7:
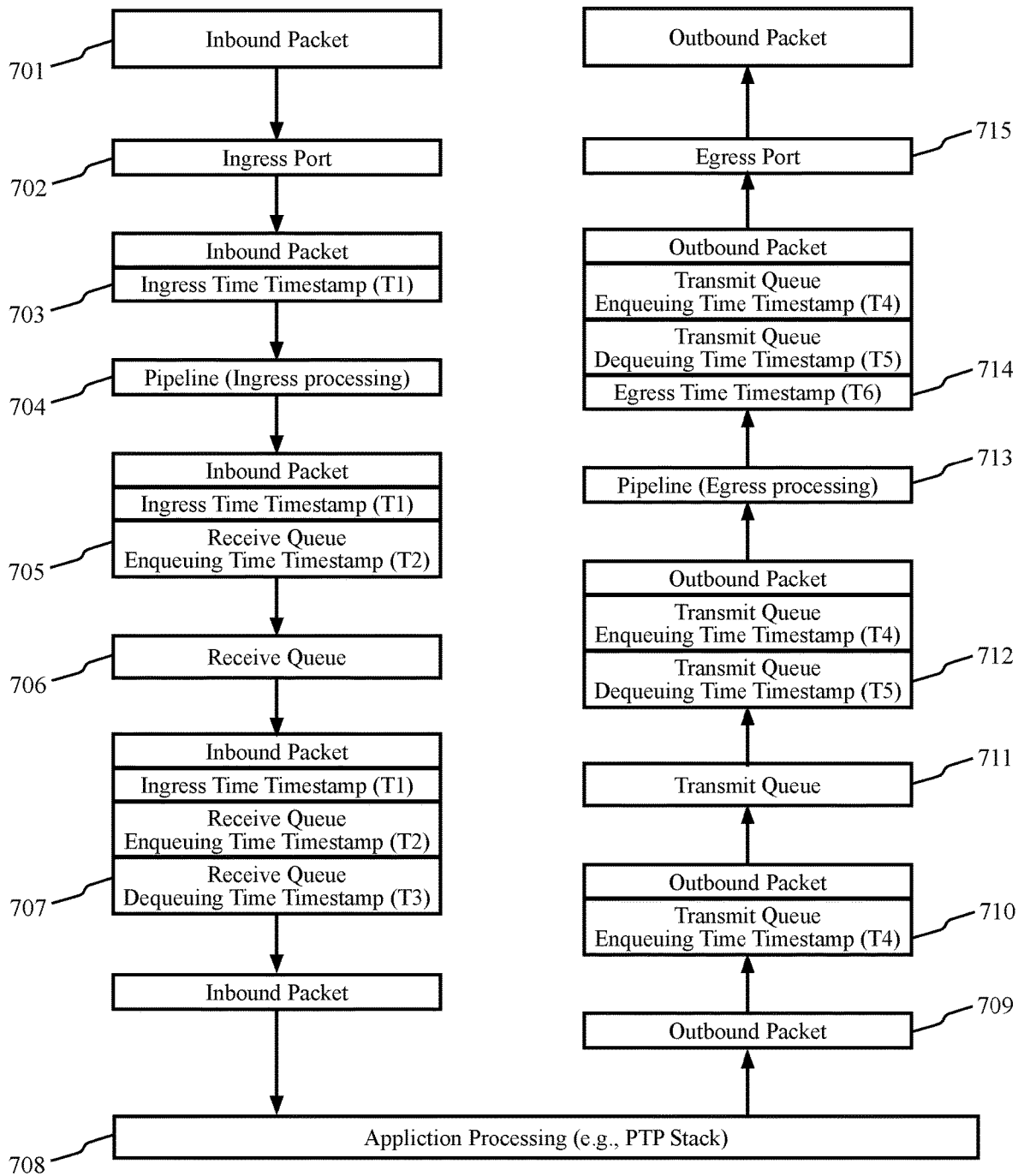
FIG. 7 illustrates packet timestamping according to some aspects.

FIG. 7 illustrates packet timestamping according to some aspects. Timestamps can be associated with a packet as the packet passes through a network appliance. The timestamps can be associated with the packet as metadata added to the packet's PHV or can be attached to or associated with the packet in some other manner. An inbound packet 701 can be received at the ingress port 702 of a network appliance. An ingress time timestamp 703 can be associated with the inbound packet 701 to indicate the moment the packet was received by the network appliance. An ingress pipeline 704 can perform ingress processing after which the packet can be placed on a receive queue 706. A receive queue enqueuing time timestamp 705 can be associated with the inbound packet to indicate the moment the packet left the ingress pipeline and was placed on the receive queue 706. The metadata may also indicate which receive queue the inbound packet was placed on such that metrics and statistics can be collected for each receive queue. Eventually, the inbound packet can be removed from the receive queue 706 and passed to an application for application processing. A receive queue dequeuing time timestamp 707 can be associated with the inbound packet to indicate the moment the inbound packet was removed from the receive queue and passed to an application 708.

The application 708 can produce an outbound packet 709 and submit the outbound packet 709 to a transmit queue 711. A transmit queue enqueuing time timestamp 705 can be associated with the outbound packet to indicate the moment the outbound packet was placed on the transmit queue 711. The metadata may also indicate which transmit queue the outbound packet was placed on such that metrics and statistics can be collected for each transmit queue. Eventually, the outbound packet can be removed from the transmit queue 711 and passed to an egress pipeline 713. A transmit queue dequeuing time timestamp 712 can be associated with the outbound packet to indicate the moment the outbound packet was removed from the transmit queue and passed to the egress pipeline 713. The egress pipeline can process the outbound packet and submit it to an egress port 715 that may immediately transmit the outbound packet towards its destination. An egress time timestamp 714 may be associated with the outbound packet 709 to indicate the moment the outbound packet exited the egress pipeline. A P4 packet processing pipeline 408 can be the ingress pipeline or the egress pipeline. Some implementations may use the same P4 packet processing pipeline 408 as both the ingress pipeline and the egress pipeline. Some implementations may use one P4 packet processing pipeline to implement the ingress pipeline and another P4 packet processing pipeline to implement the egress pipeline.

"T1" can be used to indicate the ingress time timestamp 703 for a packet. "T2" can be used to indicate the receive queue enqueuing time timestamp 705 for a packet. "T3" can be used to indicate the receive queue dequeuing time timestamp 707 for a packet. "T4" can be used to indicate the transmit queue enqueuing time timestamp 710 for a packet. "T5" can be used to indicate the receive queue dequeuing time timestamp 712 for a packet. "T6" can be used to indicate the egress time timestamp 714 for a packet.

Figure 8:
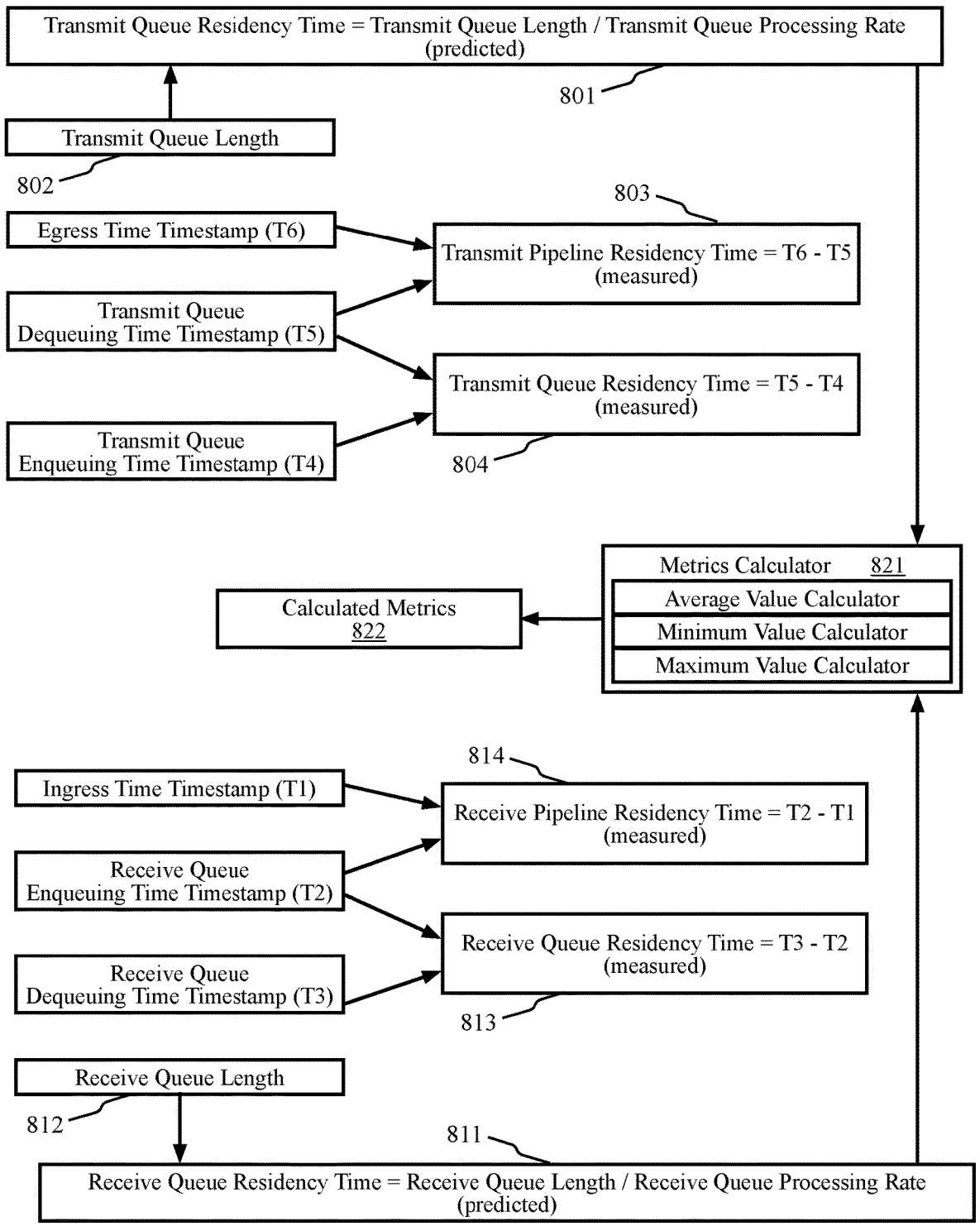
FIG. 8 illustrates using timestamps to determine metrics and residency times according to some aspects.

FIG. 8 illustrates using timestamps to determine metrics and residency times according to some aspects. A predicted transmit queue residency time 801 can be calculated by dividing the transmit queue length 802 by the transmit queue processing rate. The transmit queue processing rate may be a known value for the transmit queue or may be estimated based on measurements of the number of transmit queue packets that are processed over a time period. A measured transmit queue residency time 804 can be calculated as T5−T4. A transmit pipeline residency time 803 of a packet may be calculated as T6−T5. A metrics calculator 821 can produce calculated metrics 822 that indicate various statistics of the predicted transmit queue residency times, the measured transmit queue residency times, and the transmit queue residency times. The calculated metrics can include the minimum, maximum, average (a.k.a. mean), median, variance, standard variation, and other calculated metrics. Algorithms for calculating minimum, maximum, average, median, variance, standard variation, and other calculated metrics are well known in the programming arts. Metrics may be calculated for a predefined time period (e.g., for one hour, from specified start time to specified end time). Metrics may be calculated and continuously updated starting from an initialization time or a start time.

A predicted receive queue residency time 811 can be calculated by dividing the receive queue length 812 by the receive queue processing rate. The receive queue processing rate may be a known value for the receive queue or may be estimated based on measurements of the number of receive queue packets that are processed over a time period. A measured receive queue residency time 813 can be calculated as T3−T2. A receive pipeline residency time 814 of a packet may be calculated as T2−T1. A metrics calculator 821 can produce calculated metrics 822 that indicate various statistics of the predicted receive queue residency times, the measured receive queue residency times, and the receive queue residency times. The calculated metrics can include the minimum, maximum, average, median, variance, standard variation, and other calculated metrics.

Figure 9:
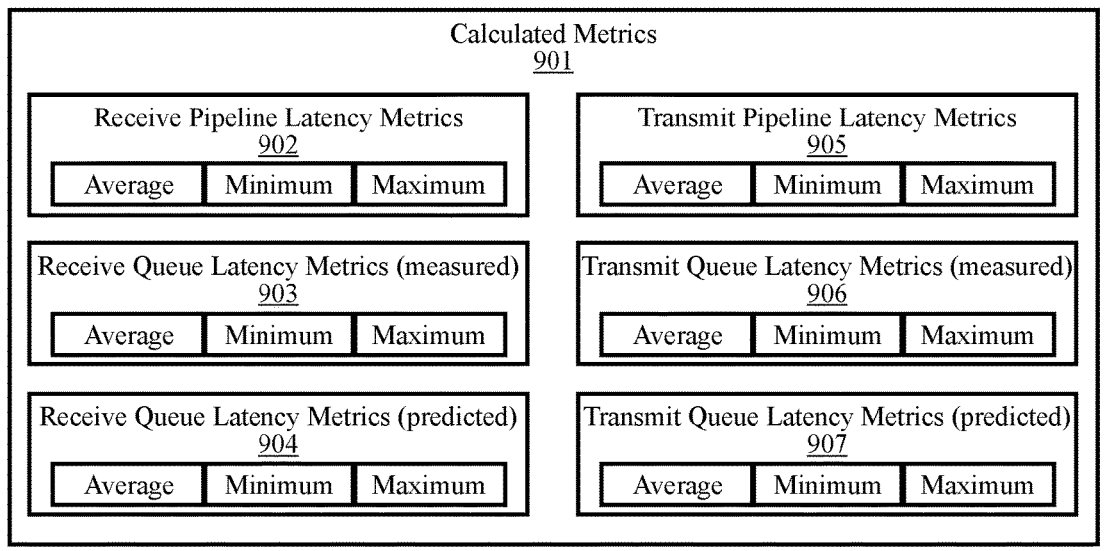
FIG. 9 illustrates calculated metrics according to some aspects.

FIG. 9 illustrates calculated metrics 901 according to some aspects. The calculated metrics 901 can include receive pipeline latency metrics 902, measured receive queue latency metrics 903, predicted receive queue latency metrics 904, transmit pipeline latency metrics 905, measured transmit queue latency metrics 906, and predicted transmit queue latency metrics 907. The receive pipeline latency metrics 902 can include the average, minimum, and maximum values of the receive pipeline residency time 814. The measured receive queue latency metrics 903 can include the average, minimum, and maximum values of the measured receive queue residency time 813. The predicted receive queue latency metrics 904 can include the average, minimum, and maximum values of the predicted receive queue residency time 811. The transmit pipeline latency metrics 905 can include the average, minimum, and maximum values of the transmit pipeline residency time 803. The measured transmit queue latency metrics 906 can include the average, minimum, and maximum values of the measured transmit queue residency time 804. The predicted transmit queue latency metrics 907 can include the average, minimum, and maximum values of the predicted transmit queue residency time 801.

Figure 10:
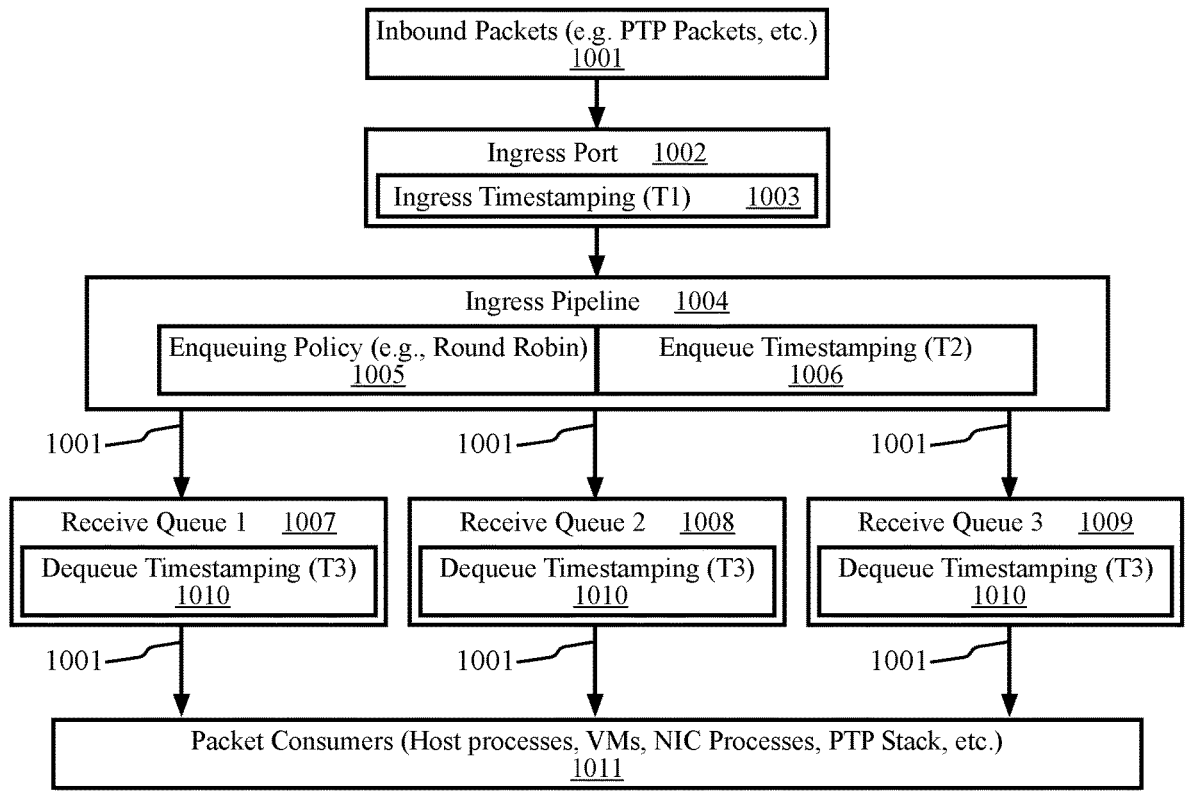
FIG. 10 illustrates packet consumers receiving network packets via receive queues and an ingress port according to some aspects.

FIG. 10 illustrates packet consumers 1011 receiving network packets via receive queues and an ingress port according to some aspects. Inbound packets 1001 can be received by an ingress port 1002 where ingress timestamping 1003 can associate values for T1 with the inbound packets 1001. An ingress pipeline 1004 can process the inbound packets 1001. The ingress pipeline can include enqueue timestamping 1006 that can associate enqueuing times with inbound packets. The processing can include selecting a receive queue (e.g., receive queue 1 1007, receive queue 2 1008, receive queue 3 1009, etc.) onto which to place each inbound packet. The packet PHV can be used to select a receive queue or set of receive queues. All packets for a specific flow, as indicated by the packets' 5-tuple, may be placed on a specific queue or distributed among a set of queues. All packets using a specific protocol may be distributed among a set of queues. For example, PTP packets may be distributed among all the receive queues or a specific set of the receive queues. Packets may be distributed among a set of receive queues in accordance with an enqueuing policy 1005. Well known enqueuing policies include round robin and weighted round robin. Packet consumers (e.g., host process, VM, NIC process, smart NIC process, PTP stack, etc.) receive the inbound packets 1001 from the receive queues. Dequeue timestamping 1010 can associate dequeuing times with inbound packets when the packets are dequeued.

Figure 11:
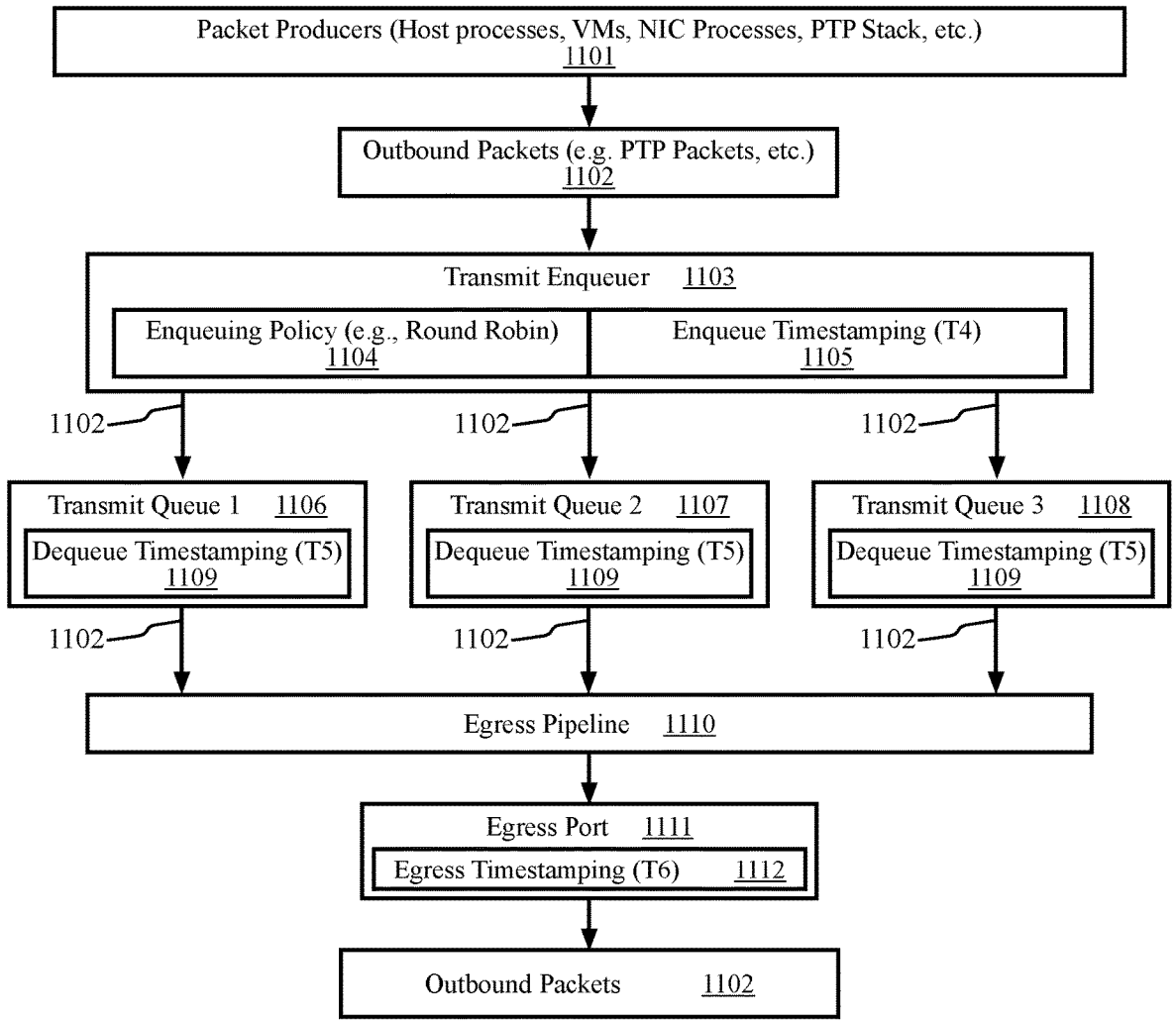
FIG. 11 illustrates packet producers sending packets via transmit queues and an egress port according to some aspects.

FIG. 11 illustrates packet producers 1101 sending packets via transmit queues and an egress port according to some aspects. The packet producers 1101 (e.g., host process, VM, NIC process, smart NIC process, PTP stack, etc.) can produce outbound packets 1102. A transmit enqueuer 1103 can distribute the outbound packets 1102 among a set of transmit queues (e.g., transmit queue 1 1106, transmit queue 2 1107, transmit queue 3 1108, etc.) in accordance with an enqueuing policy 1104. The outbound packets 1102 can be dequeued from the transmit queues and sent to an egress pipeline 1110 that processes the outbound packets 1102 and passes them to an egress port that transmits them toward their destinations. Enqueue timestamping 1105 can associate values for T4 with the outbound packets when the packets are enqueued on a transmit queue. Dequeue timestamping 1109 can associate values for T5 when the outbound packets are dequeued from the transmit queues. Egress timestamping 1112 can associate values for T6 with the outbound packets when the packets are transmitted.

The PHVs of inbound packets and outbound packets can be used to select packets for latency metrology. Packets may be selected for latency metrology in accordance with a policy. The policy may include selecting all packets of a certain protocol, such as PTP, for latency metrology. The policy may include selecting packets randomly for latency metrology (e.g., the probability of being selected equals 1 in 10,000 or some other value). The policy may include selecting every Nth inbound packet for latency metrology. The policy may include selecting every Nth outbound packet for latency metrology. The policy may include selecting packets for each queue (receive or transmit) where every Nth packet enqueued on the queue is selected for latency metrology. An indicator or flag (e.g., a latency metrology flag) in a packet's PHV can indicate that the packet has been selected for latency metrology. Timestamps such as T1, T2, T3, T4, T5, and T6 can be associated with each packet selected for latency metrology. A timestamp can be associated with a packet by being added as metadata to the packet's PHV.

Figure 12:
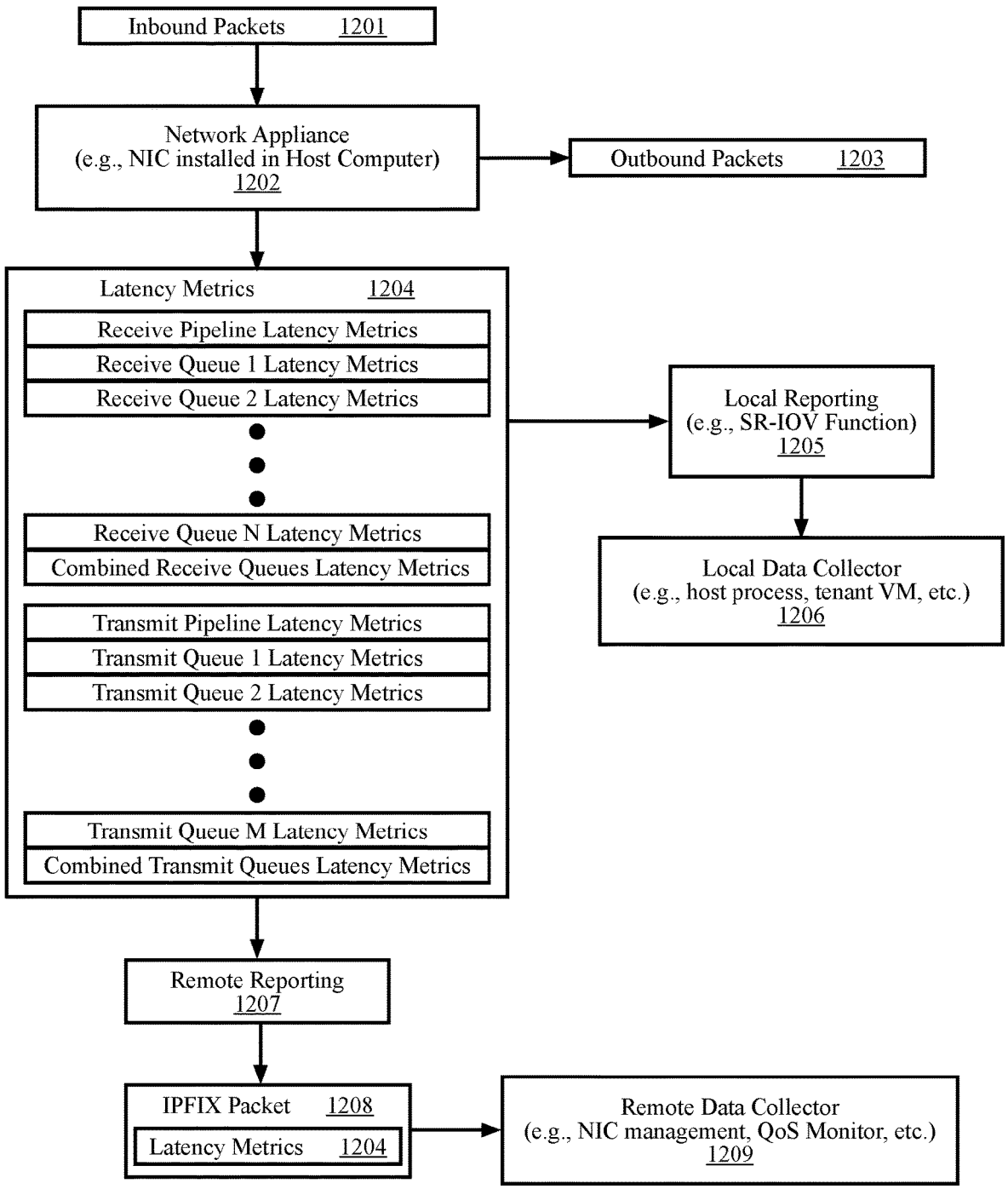
FIG. 12 illustrates data collectors collecting latency metrics according to some aspects.

FIG. 12 illustrates data collectors collecting latency metrics 1204 according to some aspects. A network appliance 1202 is receiving inbound packets 1201, sending outbound packets 1203, and determining latency metrics 1204. The latency metrics 1204 can include receive pipeline latency metrics, latency metrics for each receive queue, combined or aggregated receive queue latency metrics, transmit pipeline latency metrics, latency metrics for each transmit queue, and combined or aggregated transmit queue latency metrics. A combined or aggregated queue latency metric can indicate a value for a set of queues. Examples of combined or aggregated queue latency metrics include the average latency of all the receive queues, the maximum transmit latency of a set of transmit queues, etc.

Local reporting 1205 can provide the latency metrics 1204 to a local data collector 1206. The local data collector may be a process running on the network appliance itself. The network appliance can be a peripheral component interconnect express (PCIe) card installed in a host computer. As such, the local collector may be a host process, tenant VM, or other process running on the host computer. The latency metrics can be exported to a host computer process via PCIe single root IO virtualization (SR-IOV). Those practiced in PCIe hardware are familiar with SR-IOV. Remote reporting 1207 can provide the latency metrics 1204 to a remote data collector 1209. An IPFIX packet 1208 that includes the latency metrics 1204 can be sent to the remote data collector 1209.

Figure 13:
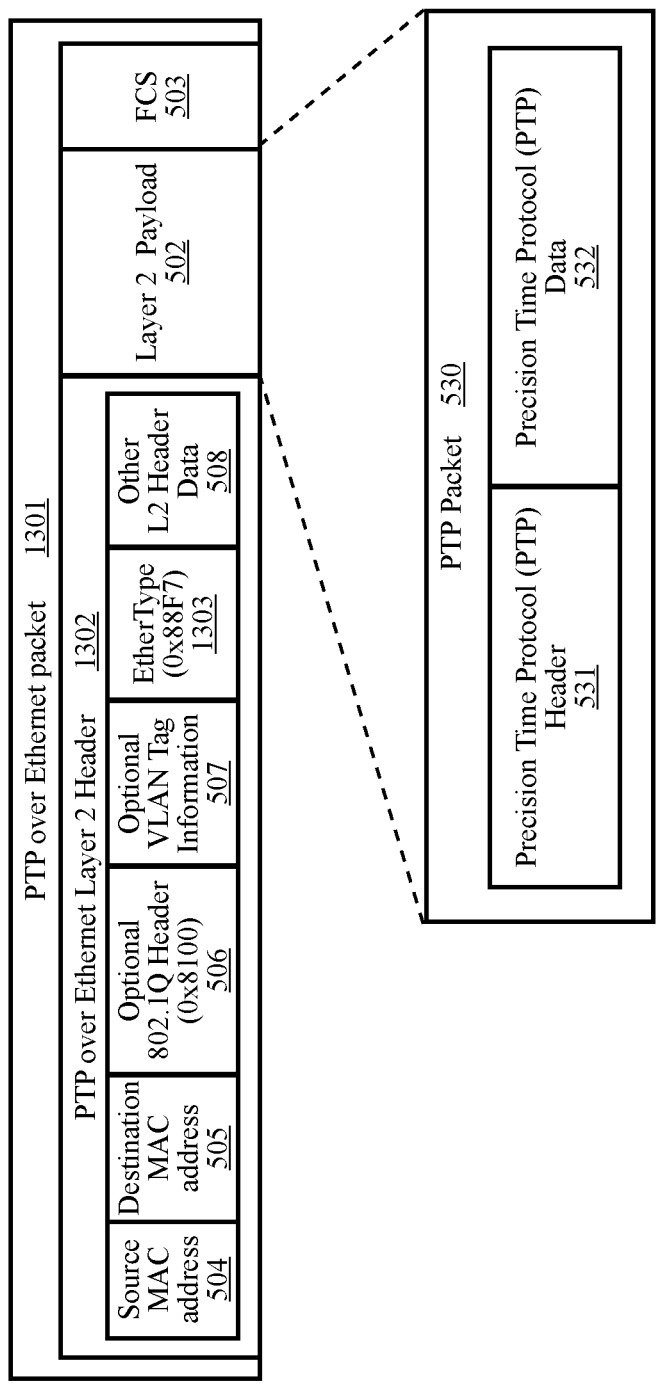
FIG. 13 illustrates a layer 2 PTP packet that can be used in accordance with certain aspects.

FIG. 13 illustrates a layer 2 PTP packet 1301 that can be used in accordance with certain aspects. As discussed above, PTP packets can be the payloads of UDP packets. The PTP specification also provides for carrying PTP packets as ethernet payloads. The PTP over ethernet packet 1301 includes a PTP over ethernet layer 2 header 1302 and a layer 2 payload 502. Ethernet headers include an EtherType field 1303. A value of 0x88F7 in the EtherType field 1303 indicates that the packet is a PTP over ethernet packet having a PTP packet 530 as the layer 2 payload 502.

Figure 14:
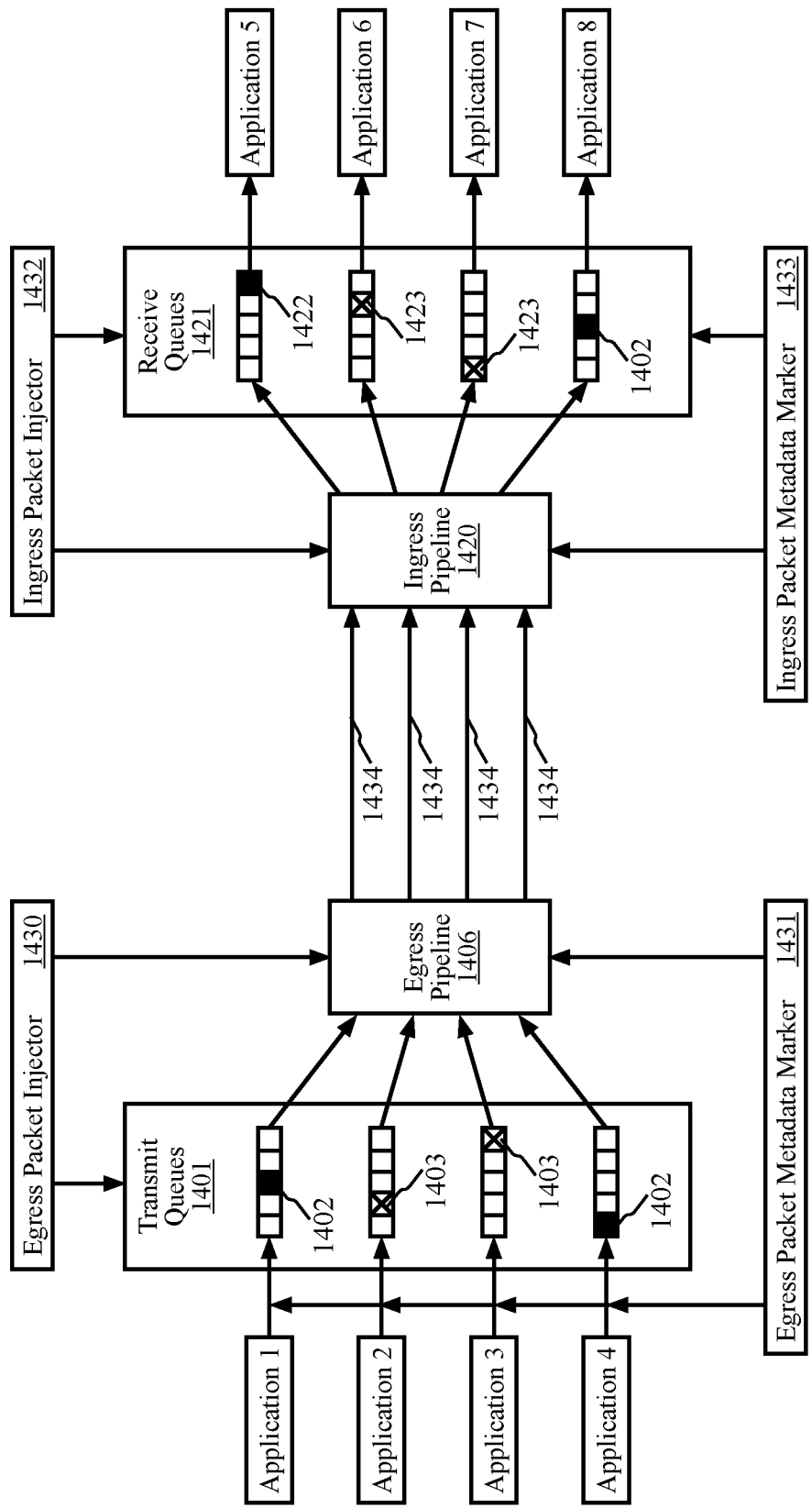
FIG. 14 illustrates packets being injected or marked for latency metrology according to some aspects.

FIG. 14 illustrates packets being injected or marked for latency metrology according to some aspects. Applications can produce packets that are enqueued on transmit queues 1401. The packets on the transmit queues 1401 can be dequeued and provided to an egress pipeline 1406. The egress pipeline 1406 can process the packets and can pass the packets to an egress port. The egress port can transmit the packets within network traffic flows 1434. The network traffic flows can be received by an ingress port and passed to an ingress pipeline 1420 that can process the packets and enqueue them on receive queues 1421. The packets can be dequeued from the receive queues 1421 and provided to other applications.

An egress packet injector 1430 can add injected packets 1402 to the transmit queues or inject packets directly into the egress pipeline. The injected packets 1402 can be PTP packets or can be of some other protocol. The injected packets 1402 can be marked for latency metrology. The injected packets 1402 may be dropped instead of being transmitted from an egress port. For example, a "drop" egress port may be used such that egress timestamps are associated with the packets but the packets are not transmitted. The injected packets 1402 may be transmitted within the network traffic flows 1434. For example, a PTP packet may be injected and included in a network traffic flow.

An egress packet metadata marker 1431 can mark packets for latency metrology, thereby producing latency metrology marked packets 1403. Input stages or routines that enqueue packets in the transmit queues may incorporate an egress metadata marker. As discussed above a flag in the PHV can mark a packet for latency metrology. PHVs are not transmitted with the packets, as such the network traffic flows do not include latency metrology marked packets 1403 unless a latency metrology flag or indicator is embedded in the transmitted packet. For example, a vendor specific extension of a protocol may include the latency metrology flag and may include timestamps.

An ingress packet injector 1432 may inject packets into the ingress pipeline 1420. For example, the ingress packet injector 1432 may appear to be an ingress port to the ingress pipeline 1420. The ingress packet injector 1432 may add injected packets 1422 to the receive queues 1421. An ingress packet metadata marker 1433 can mark packets for latency metrology, thereby producing latency metrology marked packets 1423. The ingress pipeline 1420 may incorporate an ingress packet metadata marker 1433.

One of the receive queues is shown with an injected packet 1402 that was injected on the transmit side. Such a packet may be a PTP packet injected by the egress packet injector 1430, carried in a network traffic flow 1434, received by in ingress port, processed by the ingress pipeline 1420, and placed in a receive queue. The packet 1402 may be dropped before it is provided to an application. For example, a smart NIC or device driver can be configured to drop PTP packets upon dequeuing from a receive queue. In one alternative, all PTP packets are dropped. In another alternative PTP packets with a predetermined clock domain identifier are dropped.

Figure 15:
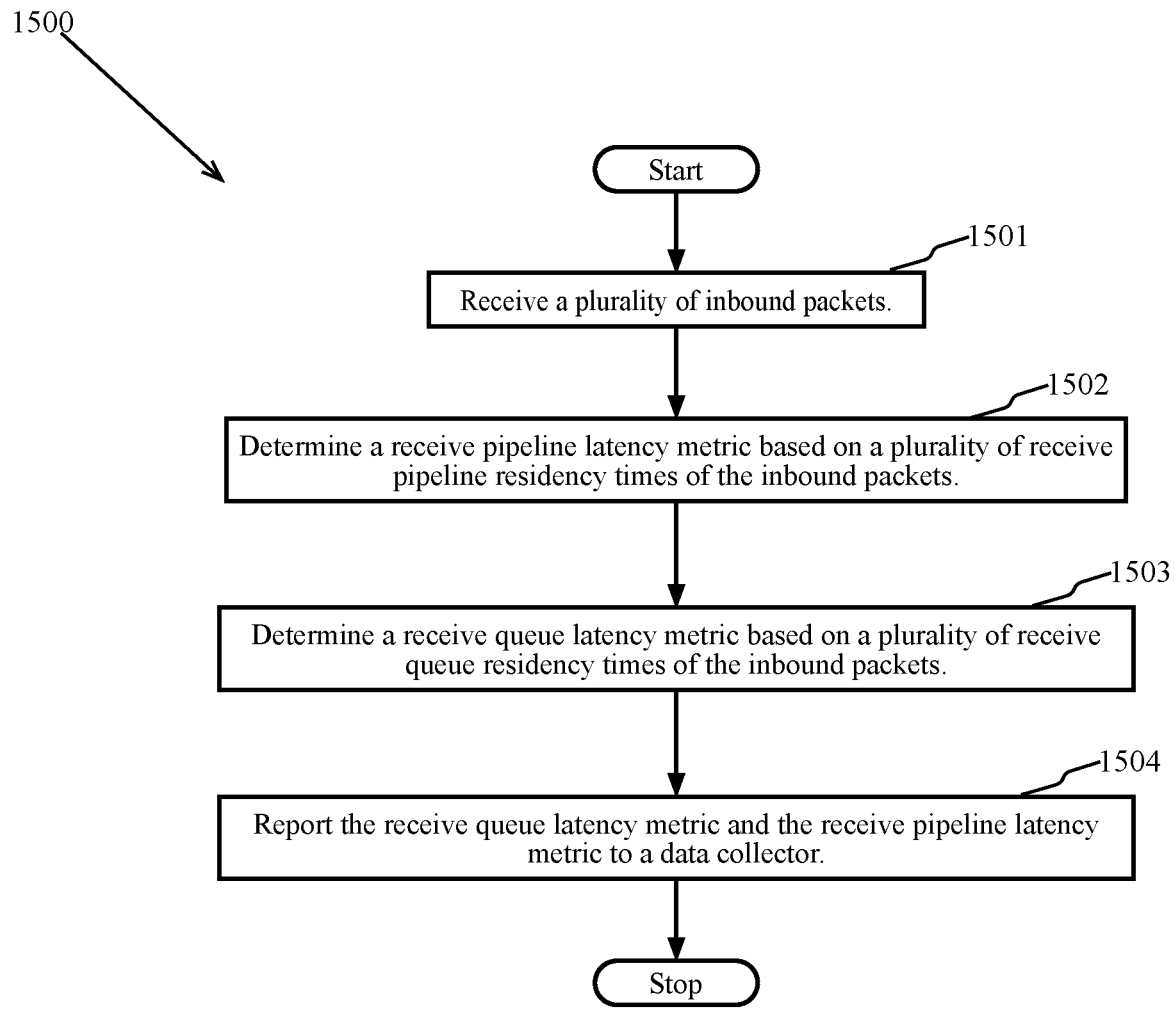
FIG. 15 is a high-level flow diagram illustrating a method for queue and pipeline latency metrology in network devices and smart NICs according to some aspects.

FIG. 15 is a high-level flow diagram illustrating a method for queue and pipeline latency metrology in network devices and smart NICs 1500 according to some aspects. After the start, at block 1501 the method can receive a plurality of inbound packets. At block 1502, the method can determine a receive pipeline latency metric based on a plurality of receive pipeline residency times of the inbound packets. At block 1503, the method can determine a receive queue latency metric based on a plurality of receive queue residency times of the inbound packets. At block 1504, the method can report the receive queue latency metric and the receive pipeline latency metric to a data collector.

Figure 16:
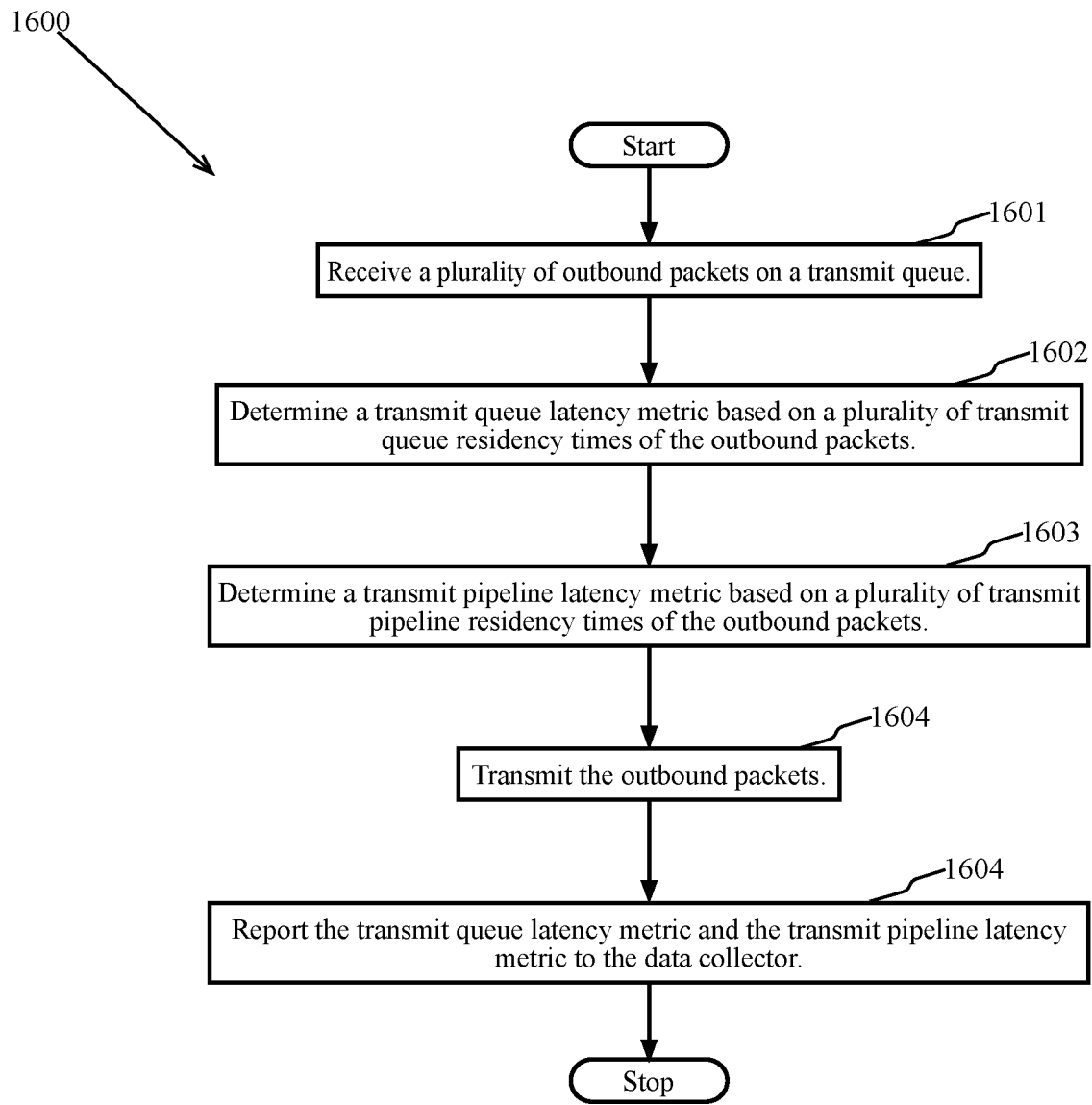
FIG. 16 is a high-level flow diagram illustrating another method for queue and pipeline latency metrology in network devices and smart NICs according to some aspects.

FIG. 16 is a high-level flow diagram illustrating another method for queue and pipeline latency metrology in network devices and smart NICs 1600 according to some aspects. After the start, at block 1601, the method can receive a plurality of outbound packets on a transmit queue. At block 1602, the method can determine a transmit queue latency metric based on a plurality of transmit queue residency times of the outbound packets. At block 1603, the method can determine a transmit pipeline latency metric based on a plurality of transmit pipeline residency times of the outbound packets. At block 1604, the method can transmit the outbound packets. At block 1605, the method can report the transmit queue latency metric and the transmit pipeline latency metric to the data collector.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. A PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
   receiving a plurality of inbound packets;
   determining a plurality of receive queue enqueuing time timestamps of the inbound packets;
   determining a plurality of receive queue dequeuing time timestamps of the inbound packets;
   using the receive queue enqueuing time timestamps and the receive queue dequeuing time timestamps to determine a plurality of receive queue residency times of the inbound packets;
   determining a receive pipeline latency metric based on a plurality of receive pipeline residency times of the inbound packets;
   determining a receive queue latency metric based on the plurality of receive queue residency times of the inbound packets; and
   reporting the receive queue latency metric and the receive pipeline latency metric to a data collector.

2. The method of claim 1 further including:
   dequeuing the inbound packets from a receive queue; and
   providing the inbound packets to a precision time protocol (PTP) stack,
   wherein the inbound packets are PTP packets.

3. The method of claim 1 further including:
   determining a plurality of receive queue latency metrics for a plurality of receive queues; and
   reporting the receive queue latency metrics to the data collector,
   wherein
      the inbound packets are enqueued on the plurality of receive queues, and
      the receive queue latency metric is one of the receive queue latency metrics.

4. The method of claim 3 wherein
   the inbound packets are PTP packets, and
   the PTP packets are enqueued on the receive queues according to a policy.

5. The method of claim 4, further including:
   determining a plurality of ingress time timestamps of the inbound packets; and
   using the ingress time timestamps and the receive queue enqueuing time timestamps to determine the plurality of receive pipeline residency times of the inbound packets.

6. The method of claim 1 wherein the inbound packets are selected for determining the receive pipeline latency metric according to a policy.

7. The method of claim 1 wherein the receive queue latency metric and the receive pipeline latency metric are sent to the data collector in an internet protocol flow information export packet.

8. The method of claim 1 further including:
   receiving a plurality of outbound packets on a transmit queue;
   determining a transmit queue latency metric based on a plurality of transmit queue residency times of the outbound packets;
   determining a transmit pipeline latency metric based on a plurality of transmit pipeline residency times of the outbound packets; and
   reporting the transmit queue latency metric and the transmit pipeline latency metric to the data collector.

9. The method of claim 8 further including:
   timestamping the outbound packets with a transmit queue enqueuing time; and
   timestamping the outbound packets with a transmit queue dequeuing time.

10. The method of claim 8 wherein the outbound packets are selected from outbound network traffic according to a policy.

11. The method of claim 8 further including:
    determining a plurality of transmit queue latency metrics for a plurality of transmit queues; and
    reporting the transmit queue latency metrics to the data collector,
    wherein
       the outbound packets are enqueued on the plurality of transmit queues, and
       the transmit queue latency metric is one of the transmit queue latency metrics.

12. The method of claim 11 wherein
    the outbound packets are PTP packets, and
    the PTP packets are enqueued on the transmit queues according to a policy.

13. The method of claim 1 further including timestamping the inbound packets with a receive queue enqueuing time.

14. The method of claim 1 further including timestamping the inbound packets with a receive queue dequeuing time.

15. A method comprising:
    receiving a plurality of outbound packets on a transmit queue of a network appliance;
    using an egress pipeline of the network appliance to process the outbound packets after dequeuing the outbound packets from the transmit queue;
    transmitting the outbound packets from an egress port of the network appliance;
    determining a transmit queue latency metric based on a plurality of transmit queue residency times of the outbound packets on the transmit queue;

determining a transmit pipeline latency metric based on a plurality of transmit pipeline residency times of the outbound packets in the egress pipeline; and reporting the transmit queue latency metric and the transmit pipeline latency metric to a data collector.

16. The method of claim 15 wherein the outbound packets are selected from outbound network traffic according to a policy.

17. The method of claim 15 further including:

determining a plurality of transmit queue latency metrics for a plurality of transmit queues; and reporting the transmit queue latency metrics to the data collector, wherein the outbound packets are enqueued on the plurality of transmit queues, and the transmit queue latency metric is one of the transmit queue latency metrics.

18. The method of claim 17 wherein the outbound packets are PTP packets, and the PTP packets are enqueued on the transmit queues according to a policy.

19. The method of claim 18 wherein the policy is a round robin policy.

20. A system comprising:

a means for determining a receive queue latency metric;

a means for determining a receive pipeline latency metric;

a means for determining a transmit queue latency metric;

a means for determining a transmit pipeline latency metric; and a means for reporting the receive queue latency metric, the receive pipeline latency metric, the transmit queue latency metric, and the transmit pipeline latency metric to a data collector.

* * * * *